US010488963B2

United States Patent
Weng et al.

(10) Patent No.: US 10,488,963 B2
(45) Date of Patent: Nov. 26, 2019

(54) IN-CELL TOUCH DISPLAY APPARATUS WITH PRESSURE DETECTION FUNCTION

(71) Applicant: HON HAI PRECISION INDUSTRY CO., LTD., New Taipei (TW)

(72) Inventors: Yu-Fu Weng, New Taipei (TW); Chien-Wen Lin, New Taipei (TW); Chia-Lin Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 29 days.

(21) Appl. No.: 15/674,542

(22) Filed: Aug. 11, 2017

(65) Prior Publication Data

US 2018/0046297 A1 Feb. 15, 2018

Related U.S. Application Data

(60) Provisional application No. 62/374,067, filed on Aug. 12, 2016.

(51) Int. Cl.

| G06F 3/041 | (2006.01) |
| G02F 1/1333 | (2006.01) |
| G02F 1/1335 | (2006.01) |
| G02F 1/1343 | (2006.01) |
| G06F 3/044 | (2006.01) |

(Continued)

(52) U.S. Cl.
CPC ........ *G06F 3/0412* (2013.01); *G02F 1/13338* (2013.01); *G02F 1/133514* (2013.01); *G02F 1/134336* (2013.01); *G06F 3/044* (2013.01); *G06F 3/0416* (2013.01); *G02F 1/1368* (2013.01); *G06F 2203/04105* (2013.01); *G06F 2203/04106* (2013.01); *G09G 3/3648* (2013.01)

(58) Field of Classification Search
CPC .......... G02F 1/13338; G02F 1/133514; G02F 1/134336; G02F 1/1368; G06F 2203/04105; G06F 2203/04106; G06F 3/0412; G06F 3/0416; G06F 3/044; G09G 3/3648

See application file for complete search history.

(56) References Cited

U.S. PATENT DOCUMENTS 9,417,725 B1 * 8/2016 Watazu ................ G06F 3/044
2004/0217945 A1 * 11/2004 Miyamoto ............ G06F 3/0412
345/173

(Continued)

FOREIGN PATENT DOCUMENTS

CN 105117058 A 12/2015

*Primary Examiner* — Ram A Mistry
(74) *Attorney, Agent, or Firm* — ScienBiziP, P.C.

(57) ABSTRACT

An in-cell touch display apparatus includes a color filter structure, a thin film transistor (TFT) array structure, a liquid crystal layer between the color filter structure and the TFT array structure, and a driving and detection unit. The color filter structure comprises a touch electrode layer. The TFT array structure comprises a conductive layer. The touch electrode layer comprises a plurality of touch electrodes arranged in a matrix and a plurality of pressure sensing electrodes arranged in a matrix. The touch electrodes and the pressure sensing electrodes are located on a same layer. The conductive layer comprises a plurality of conductive portions. The touch electrodes sense a touch position, and the pressure sensing electrodes and the conductive portions cooperate with each other to sense a touch pressure.

17 Claims, 5 Drawing Sheets

(51) Int. Cl.
  *G02F 1/1368* (2006.01)
  *G09G 3/36* (2006.01)

(56) References Cited

U.S. PATENT DOCUMENTS

| | | | |
|---|---|---|---|
| 2015/0193055 A1* | 7/2015 | Ando | G06F 3/044 345/174 |
| 2017/0269763 A1* | 9/2017 | Yang | G06F 3/0412 |
| 2017/0308237 A1* | 10/2017 | Sun | G06F 3/0412 |

* cited by examiner

IN-CELL TOUCH DISPLAY APPARATUS WITH PRESSURE DETECTION FUNCTION

CROSS-REFERENCE TO RELATED APPLICATIONS

This application claims priority to U.S. Provisional Application No. 62/374,067 filed on Aug. 12, 2016, the contents of which are incorporated by reference herein.

FIELD

The subject matter herein generally relates to an in-cell touch display apparatus.

BACKGROUND

An in-cell touch display apparatus can be integrated with the touch structure in a cell of the display panel. Such a touch display panel is used as an output device for displaying images while being used as an input device for receiving a user's touch command. The touch structure provides an extra layer for cooperating with a backlight module or a mid-frame to sense a pressure of a touch operation. The structure of the in-cell touch display apparatus needs to change, and the alignment operation of the in-cell touch display apparatus becomes more complicated. However, even a small change in structure of the in-cell touch display apparatus change can sense the intensity of the touch force. Improvement in the art is preferred.

BRIEF DESCRIPTION OF THE FIGURES

Implementations of the present disclosure will now be described, by way of example only, with reference to the attached figures.

DETAILED DESCRIPTION

Figure 1:
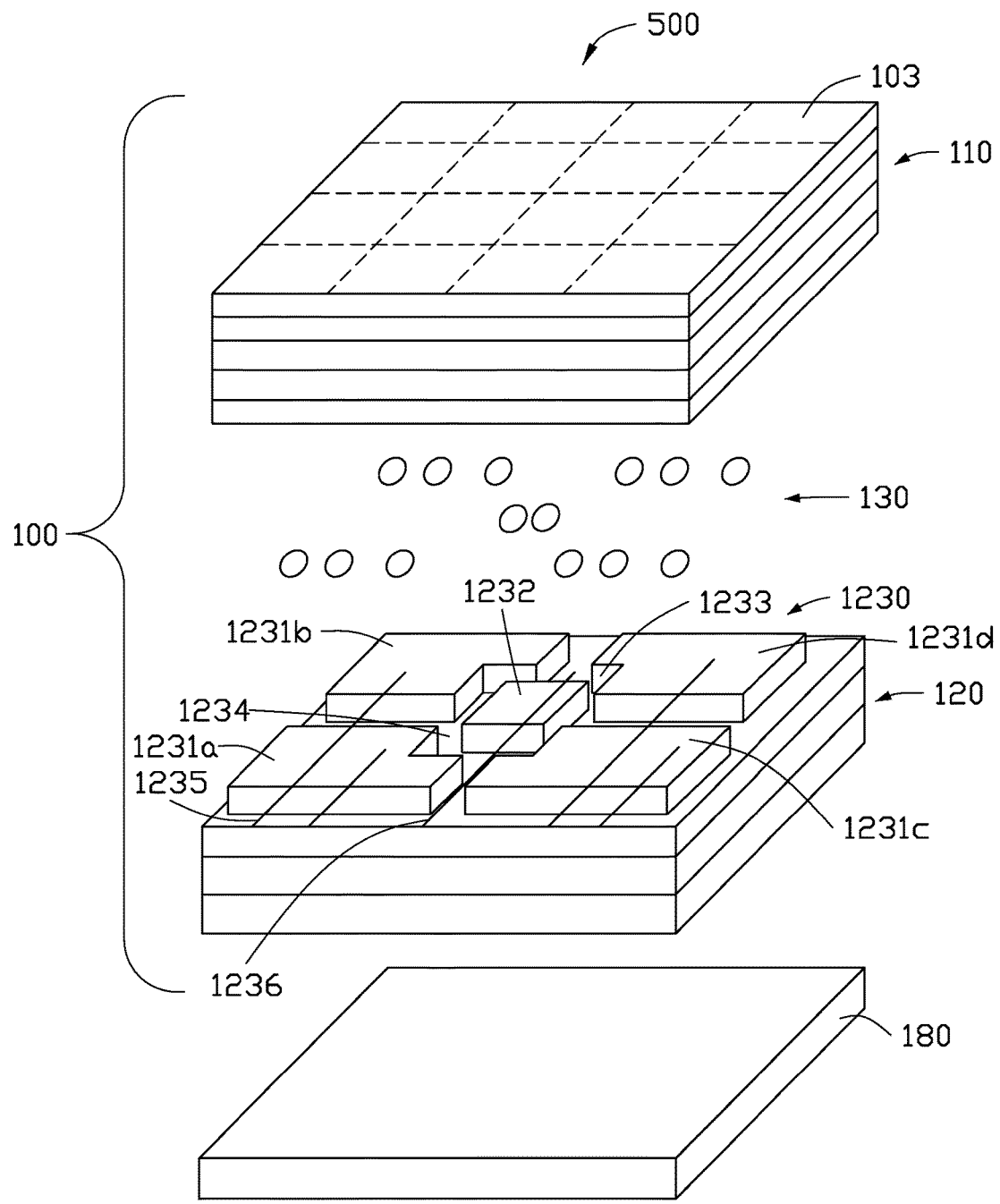
FIG. 1 is a diagram of an exemplary embodiment of an in-cell touch display apparatus with a conductive layer and a touch electrode layer.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage system. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like. The term "circuit" is defined as an integrated circuit (IC) with a plurality of electric elements, such as capacitors, resistors, amplifiers, and the like.

The present disclosure provides an in-cell touch display apparatus with functions.

FIG. 1 illustrates an exemplary embodiment of the in-cell touch display apparatus 500. The in-cell touch display apparatus 500 is capable of sensing touch position when a user's finger is pressed on the in-cell touch display apparatus 500 as well as the pressure of the user's finger. In at least one exemplary embodiment, the in-cell touch display apparatus 500 can be a mobile phone, a tablet, or a notebook.

The in-cell touch display apparatus 500 includes a display panel 100 and a backlight module 180. The backlight module 180 provides backlighting to the display panel 100. The display panel 100 defines a plurality of pixel units 103 arranged in a matrix.

The display panel 100 comprises a color filter structure 110, a thin film transistor (TFT) array structure 120, and a liquid crystal layer 130 located between the color filter structure 110 and the TFT array structure 120.

Figure 2:
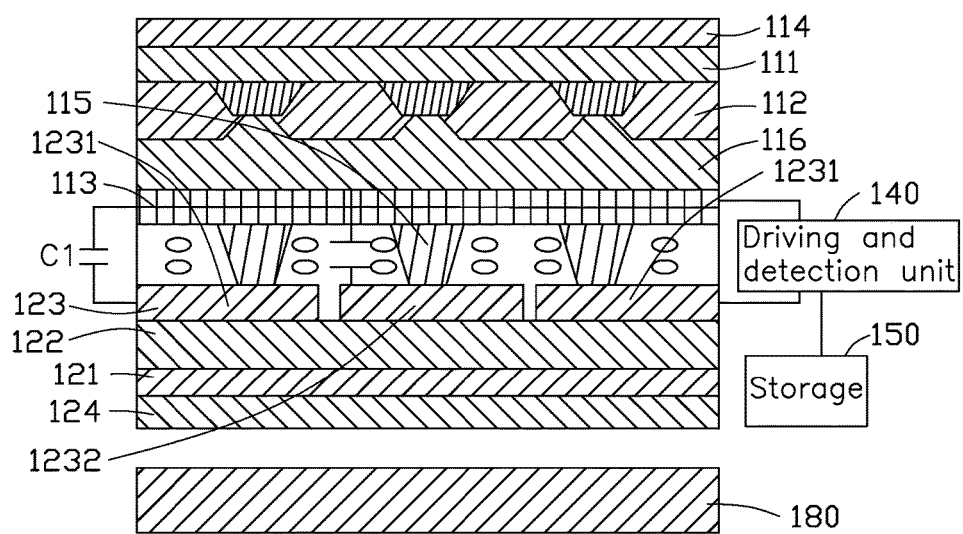
FIG. 2 is a cross-sectional view of the in-cell touch display apparatus of FIG. 1.

FIG. 2 illustrates a cross-sectional view of the in-cell touch display apparatus 500. The color filter structure 110 includes a first substrate 111, a color filter layer 112, a conductive pattern layer 113, a first polarizer 114, and a plurality of spacers 115. The color filter layer 112 further includes a flat layer 116 thereby making the surface of the color filter layer 112 flat. The TFT array structure 120 includes a second substrate 121, a TFT array layer 122, a touch electrode layer 123, and a second polarizer 124.

The first substrate 111 is made of, for example, transparent glass, quartz, or plastic. Further, in other exemplary embodiment, the first substrate 111 may be, for example, a flexible substrate. Suitable materials for the flexible substrate comprise, for example, polyethersulfone (PES), polyethylenenaphthalate (PEN), polyethylene (PE), polyimide (PI), polyvinyl chloride (PVC), polyethylene terephthalate (PET), or combinations thereof.

The color filter layer 112 is located between the first substrate 111 and the flat layer 116. The color filter layer 112 is directly formed on a surface of the first substrate 111 adjacent to the liquid crystal layer 130.

Figure 3A:
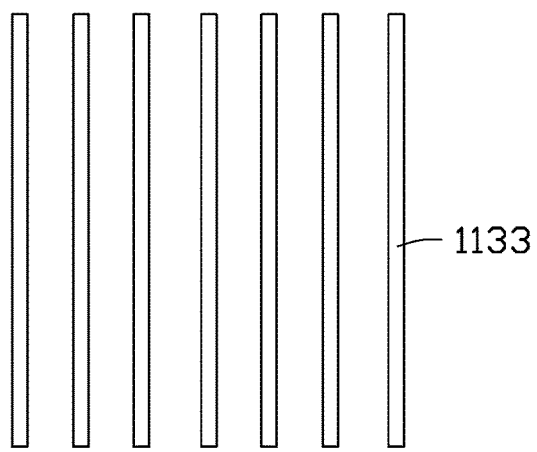
FIGS. 3a-3c are planar views of an exemplary embodiment of the conductive layer of FIG. 1.
Figure 3B:
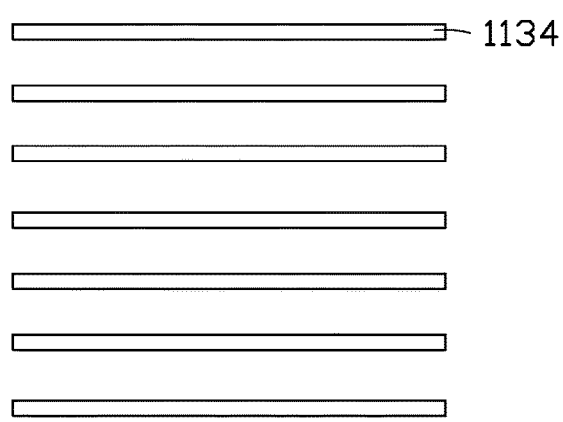
Figure 3C:
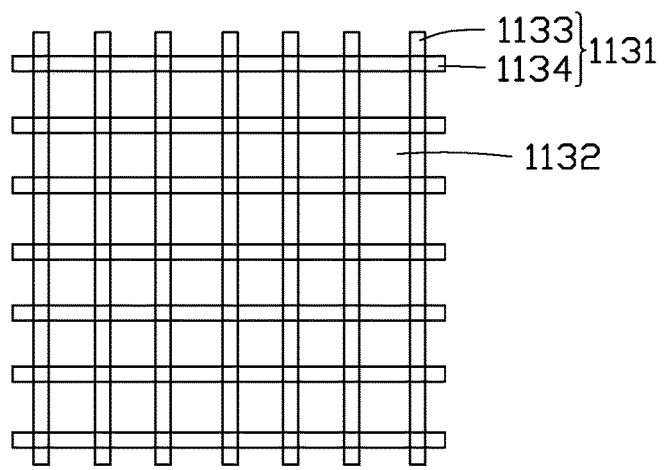

The conductive layer 113 is directly connected with a surface of the flat layer 116 adjacent to the liquid crystal layer 130. Referring also to FIG. 3c, the conductive layer 113 includes a plurality of conductive portions 1131 and a plurality of non-conductive portions 1132. In at least one exemplary embodiment, the conductive portions 1131 includes a plurality of first lines 1133 and a plurality of second lines 1134, which are crossed with each other to form a mesh. As shown in FIG. 3a, the first lines 1133 are parallel with each other along a first direction X. As shown in FIG. 3b, the second lines 1134 are parallel with each other along a second direction Y, Y being perpendicular to the first direction X. As shown in FIG. 3c, the conductive portions 1131 are formed by the first lines 1133 and the second lines 1134, and the non-conductive portions 1132 are formed by the portions surrounded by the first lines 1133 and the second lines 1134.

Referring back to FIG. 2, the first polarizer 114 is directly formed on a surface of the first substrate 110 facing away from the liquid crystal layer 130.

The spacers 115 are formed on a surface of the conductive layer 113, and further extend to the liquid crystal layer 130, making contact with the touch electrode layer 123. Each spacer 115 spaces the color filter structure 110 from the TFT array structure 120.

The second substrate 121 is made of, for example, transparent glass, quartz, or plastic. Further, in other exemplary embodiment, the first substrate 111 may be, for example, a flexible substrate. Suitable materials for the flexible substrate comprise, for example, polyethersulfone (PES), polyethylenenaphthalate (PEN), polyethylene (PE), polyimide (PI), polyvinyl chloride (PVC), polyethylene terephthalate (PET), or combinations thereof.

The TFT array layer 122 is formed on a surface of the second substrate 121 adjacent to the liquid crystal layer 130. The TFT array layer 122 is insulated from the touch electrode layer 123 via an insulation layer (not shown). The TFT array layer 122 includes a plurality of TFTs (not shown). In at least one exemplary embodiment, the TFT array layer 122 is located between the second substrate 121 and the touch electrode layer 123. In other embodiments, the touch electrode layer 123 is located between the second substrate 121 and the TFT array layer 122.

The touch electrode layer 123 is located between the liquid crystal layer 130 and the TFT array layer 122. The touch electrode layer 123 senses a position and a pressure of a touch operation applied on the in-cell touch display apparatus 500. In at least one exemplary embodiment, the touch electrode layer 123 is located in the cell of the display panel 100, for example between the first substrate 111 and the second substrate 121.

As shown in FIG. 1, the touch electrode layer 123 includes a plurality of touch electrodes 1231 arranged in a matrix and a plurality of pressure sensing electrodes 1232 arranged in a matrix. In the exemplary embodiment, the touch electrodes 1231 and the pressure sensing electrode 1232 are located at a same layer. Each touch electrode 1231 corresponds to at least two of the pixel units 103, and each of the pressure sensing electrode 1232 corresponds to at least two of the pixel units 103. Furthermore, the touch electrodes 1231 and the pressure sensing electrode 1232 are formed by patterning a conductive material layer. The touch electrodes 1231 and the pressure sensing electrodes 1232 are divided into a plurality of touch electrode units 1230. Each touch electrode unit 1230 includes at least two touch electrodes 1231 spaced from each other, one of the pressure sensing electrodes 1232 being located in a gap between the at least two touch electrodes 1231. The at least two touch electrodes 1231 are arranged in a line and surround the pressure sensing electrode 1232. Each touch electrode 1231 defines an opening 1233. The openings 1233 of the at least two touch electrodes 1231 are symmetrically defined on portions of the touch electrodes 1231 and the openings 1233 are aligned linearly. The openings 1233 of the at least two touch electrodes 1231 in each touch electrode unit 1230 cooperate with the gap located between the at least two touch electrodes 1231 to define a touch sensing portion 1234. The pressure sensing electrode 1232 is located in the pressure sensing portion 1234. In at least one exemplary embodiment, the touch electrode unit 1230 includes four touch electrodes 1231a-1231d arranged in 2×2 matrix and one pressure sensing electrode 1232. The pressure sensing electrodes 1232 are surrounded by the four electrodes 1231 in the same touch electrode unit 1230. Each touch electrode 1231 has an opening 1233 at a corner of the corresponding touch electrode 1231. The openings 1233 of the four touch electrodes 1231a-1231d are symmetrical with a center of the 2×2 matrix. The openings 1233, which cooperate with the gap between the four electrodes 1231, form the pressure sensing region 1234. The pressure sensing electrode 1232 is located in the pressure sensing region 1234.

Each touch electrode 1231 is electrically connected to a first conductive line 1235 and receives touch driving signals through the first conductive line 1235. Each pressure sensing electrode 1232 is electrically connected to a second conductive line 1236 and receives a pressure driving signal through the second conductive line 1236. The first conductive lines 1235 and the second conductive lines 1236 are insulated from each other. In at least one exemplary embodiment, the first conductive lines 1235 and the second conductive lines 1236 can be patterned in a same layer. In other exemplary embodiments, the first conductive lines 1235 and the second conductive lines 1236 can be patterned in different layers. Each touch electrode 1231 senses the position of the touch operation applied on the in-cell touch display apparatus 500. In at least one exemplary embodiment, each touch electrode 1231 forms a self-capacitive capacitor. Each force sensing electrode 1232 cooperates with the conductive layer 113 to form a force sensing capacitor C1 as shown in FIG. 2.

In other embodiments, the touch electrode layer 123 can be a mutual capacitive type touch structure, and can include a plurality of first electrodes (not shown) and a plurality of second electrodes (not shown), located on different layers. Each first electrode is supplied with a touch driving voltage, and each second electrode is supplied with a specified voltage. Touch sensing capacitors (not shown) are formed by the first electrodes and the second electrodes, and are used for sensing a position of the touch operation applied on the in-cell touch display apparatus 500.

The second polarizer 124 is directly connected to a surface of the second substrate 121 facing away the liquid crystal layer 130.

In other embodiments, the TFT array structure 120 can also include a pixel electrode layer (not shown) and a common electrode layer (not shown). These layers cooperate with each other to form an electric field to drive the liquid crystal in the liquid crystal layer 130 to be rotated, thus the light from the backlight module 180 is manipulated by the liquid crystal layer 130 to display images.

The in-cell touch display apparatus 500 further includes a driving and detection unit 140 and a storage 150.

The driving and detection unit 140 are electrically connected with the conductive layer 113 and the touch electrode layer 123. The driving and detection unit 140 determines whether a touch operation is applied on the in-cell touch display apparatus 500 based on the capacitance differences of each capacitor formed by the electrodes in touch electrode unit 1230. The driving and detection unit 140 detects average grayscale values of the pixel units 103 corresponding to each of the touch electrodes 1231 and the pressure sensing electrodes 1232. The driving and detection unit 140 further detects current capacitances of the self-capacitance capacitors formed by the touch electrodes 1231 and the pressure sensing capacitors formed by the pressure sensing electrode 1232. The driving and detection unit 140 obtains initial capacitances of the self-capacitance capacitors and the pressure sensing capacitors through the first lookup table based on the detected average grayscale value, calculates capacitance differences between the current capacitance and the corresponding initial capacitance, and compares the capacitance difference with a predetermined value. The initial capacitance is the capacitance of the self-capacitance capacitor or the pressure sensing capacitor when there is no touch applied on the in-cell touch display apparatus 100. When the capacitance difference is greater than or equal to the predetermined value, the driving and detection unit 140 determines that there is a touch operation applied on the corresponding electrode in the touch electrode unit 1230. When the capacitance difference is lower than the predetermined threshold value, the driving and detection unit 140 determines that there is no touch operation applied. In at least one exemplary embodiment, the predetermined value is 100. In other embodiments, the predetermined value can be adjusted.

The storage module 150 may be a memory of the in-cell touch display apparatus 500, and also may be an external storage card, such as a smart media (SM) card, or secure digital (SD) card, for example. The storage module 150 stores a first lookup table and a second lookup table. Table 1 shows the first lookup table with a relationship between the average grayscale values of the pixel units 103 corresponding to each of the touch electrodes 1231a-1231d and the pressure sensing electrode 1232 in the touch electrode unit 1230, and the initial capacitances of the formed capacitors. In Table 1, the initial capacitance obtained under the first gray-scale value and the second gray-scale value is taken as a single example to illustrate the first look-up or correspondence relationship. The correspondence between the initial capacitances under other average grayscale values should also be included in Table 1, but for the sake of brevity is not.

TABLE 1

| Condition | Initial capacitance | |
|---|---|---|
| Electrodes in the touch electrode unit | First average grayscale value | Second average grayscale value |
| 1231a | 20 | 200 |
| 1231b | 10 | 190 |
| 1231c | 15 | 180 |
| 1231d | 5 | 195 |
| 1232 | 0 | 205 |

As shown in Table 1, until a touch operation is applied to the display panel 100, the average grayscale value of the pixel units 103 corresponding to the touch electrode 1231a detected by the driving and detection unit 140 is equal to the first average grayscale value, and the initial capacitance of the capacitor formed by the touch electrode 1231a is 20. When the average grayscale value of the pixel units 103 corresponding to the touch electrode 1231a is equal to the second average grayscale value, the initial capacitance formed by the touch electrode 1231a is 200. When the average grayscale value of the pixel units 103 corresponding to the touch electrode 1231b is equal to the first average grayscale, the initial capacitance of the capacitor formed by the touch electrode 1231b is 10. When the average grayscale value of the pixel units 103 corresponding to the touch electrode 1231b is equal to the second average grayscale, the initial capacitance of the capacitor formed by the touch electrode 1231b is 190. When the average grayscale value of the pixel units 103 corresponding to the touch electrode 1231c is equal to the first average grayscale, the initial capacitance of the capacitor formed by the touch electrode 1231c is 15. When the average grayscale value of the pixel units 103 corresponding to the touch electrode 1231c is equal to the second average grayscale, the initial capacitance of the capacitor formed by the touch electrode 1231c is 180. When the average grayscale value of the pixel units 103 corresponding to the touch electrode 1231d is equal to the first average grayscale, the initial capacitance of the capacitor formed by the touch electrode 1231d is 5. When the average grayscale value of the pixel units 103 corresponding to the touch electrode 1231d is equal to the second average grayscale, the initial capacitance of the capacitor formed by the touch electrode 1231d is 195. When the average grayscale value of the pixel units 103 corresponding to the pressure sensing electrode 1232 is equal to the first average grayscale, the initial capacitance of the capacitor formed by the pressure sensing electrode 1232 is 0. When the average grayscale value of the pixel units 103 corresponding to the pressure sensing electrode 1232 is equal to the second average grayscale, the initial capacitance of the capacitor formed by the pressure sensing electrode 1232 is 205. In at least one exemplary embodiment, the first average grayscale value is 0, and the second average grayscale value is 255.

Table 2 shows the second lookup table with relationship between the current grayscale value, the initial capacitance, the current capacitance, the capacitance differences of each of touch electrodes 1231a-1231d and the pressure sensing electrodes 1232 in the touch electrode unit 1230, and the result.

TABLE 2

| Electrodes in the touch electrode unit | Current grayscale value | Initial capacitance | Current capacitance | Capacitance difference | Result |
|---|---|---|---|---|---|
| 1231a | 255 | 200 | 200 | 0 | NO |
| 1231b | 0 | 300 | 10 | 290 | YES |
| 1231c | 255 | 250 | 180 | 70 | NO |
| 1231d | 0 | 110 | 5 | 105 | YES |
| 1232 | 255 | 250 | 205 | 45 | NO |

As table 2 shows, when the current grayscale value of the pixel units 103 corresponding to the touch electrode 1231a detected by the driving and detection unit 140 is 255 and the current capacitance of the touch electrode 1231a is 200, the driving and detection unit 140 obtains the initial capacitance of the touch electrode 1231a based on the first lookup table Table 1. It is calculated that the capacitance difference of the touch electrode 1231a is 0, thus the driving and detection unit 140 determines that there is no touch operation applied on the touch electrode 1231a. When the current grayscale value of the pixel units 103 corresponding to the touch electrode 1231*b* detected by the driving and detection unit 140 is 0 and the current capacitance of the touch electrode 1231*b* is 300, the driving and detection unit 140 obtains the initial capacitance of the touch electrode 1231*b* based on Table 1, and then calculates that the capacitance difference of the touch electrode 1231*b* is 290. The driving and detection unit 140 thus determines that there is a touch operation applied on the touch electrode 1231*b*. When the current grayscale value of the pixel units 103 corresponding to the touch electrode 1231*c* detected by the driving and detection unit 140 is 255 and the current capacitance of the touch electrode 1231*c* is 250, the driving and detection unit 140 obtains the initial capacitance of the touch electrode 1231*c* based on Table 1, and then calculates that the capacitance difference of the touch electrode 1231*c* is 290. The driving and detection unit 140 determines that there is no touch operation applied on the touch electrode 1231*c*. When the current grayscale value of the pixel units 103 corresponding to the touch electrode 1231*d* detected by the driving and detection unit 140 is 0 and the current capacitance of the touch electrode 1231*d* is 110, the driving and detection unit 140 obtains the initial capacitance of the touch electrode 1231*d* based on Table 1, and then calculates that the capacitance difference of the touch electrode 1231*d* is 105. The driving and detection unit 140 determines that there is a touch operation applied on the touch electrode 1231*d*. When the current grayscale value of the pixel units 103 corresponding to the touch electrode 1232 detected by the driving and detection unit 140 is 255 and the current capacitance of the pressure sensing electrode 1232 is 250, the driving and detection unit 140 obtains the initial capacitance of the pressure sensing electrode 1232 from Table 1, and then calculates that the capacitance difference of the pressure sensing electrode 1232 is 45. The driving and detection unit 140 thus determines that there is no touch operation applied on the pressure sensing electrode 1232.

The driving and detection circuit 140 further calculates a pressure value based on the capacitance difference between an initial capacitance and the current capacitance of the touch electrodes 1231 and the pressure sensing electrodes 1232.

Figure 4:
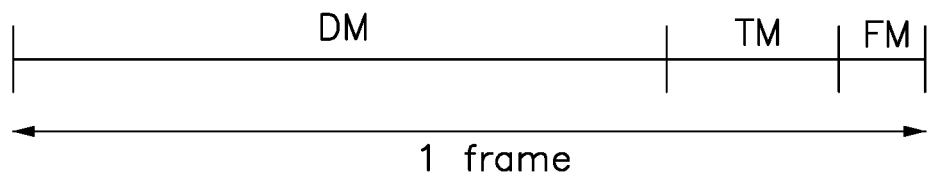
FIG. 4 is a time sequence diagram of a first exemplary embodiment of the in-cell touch display apparatus of FIG. 1 in one frame.

FIG. 4 illustrates a first exemplary embodiment of the driving of the in-cell touch display apparatus 500. In one frame, the in-cell touch display apparatus 500 sequentially operates in a display period DM, a touch sensing period TM, and a force sensing period FM. In at least one exemplary embodiment, the display period DM, the touch sensing period TM, and the force sensing period FM do not overlap with each other.

In the display period DM, the driving and detection circuit 140 supplies a common voltage on the touch electrodes 1231 and the pressure sensing electrodes 1232. In at least one exemplary embodiment, the conductive portions 1131 are electrically floated. In other exemplary embodiments, the conductive portions 1131 receive the common voltage.

In the touch sensing period TM, the driving and detection circuit 140 applies a touch driving voltage on the touch electrodes 1231, and applies the common voltage on the pressure sensing electrodes 1232. The driving and detection circuit 140 determines whether there is a touch operation applied on the in-cell touch display apparatus 500 based on the capacitance difference of the capacitor formed by the touch electrode 1231. In at least one exemplary embodiment, the conductive portions 1131 receive the common voltage.

In the pressure sensing period FM, the driving and detection circuit 140 applies a pressure driving voltage on the pressure sensing electrodes 1232, and applies the common voltage on the touch electrodes 1231. In at least one exemplary embodiment, the conductive portions 1131 receive the common voltage. In other exemplary embodiments, the conductive portions 1131 can receive a voltage different from the pressure driving voltage.

Figure 5:
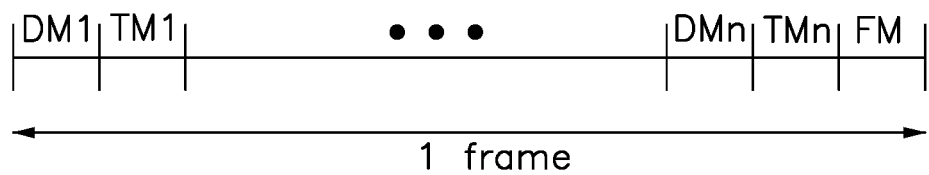
FIG. 5 is a time sequence diagrammatic view of a second exemplary embodiment of the in-cell touch display apparatus of FIG. 1 in one frame.

FIG. 5 illustrates a second embodiment of the driving of the in-cell touch display apparatus 500. In one frame, there are a plurality of display periods DM1-DMn, a plurality of touch sensing periods TM1-TMn, and a pressure sensing period FM. The in-cell touch display apparatus 500 alternately operates between one of the display periods DM1-DMn and one of the touch sensing periods TM1-TMn, and finally operates under the pressure sensing period FM alone. A sum of total time of the display periods DM1-DMn in the second exemplary embodiment is equal to the total time of the display period DM in the first exemplary embodiment. A sum of total time of the touch sensing periods TM1-TMn in the second exemplary embodiment is equal to the total time of the touch period TM in the first exemplary embodiment. In at least one exemplary embodiment, a number of the display periods DM1-DMn is equal to a number of the touch sensing periods TM1-TMn. In other exemplary embodiments, a number of the display periods DM1-DMn is different from a number of the touch sensing periods TM1-TMn.

Figure 6:
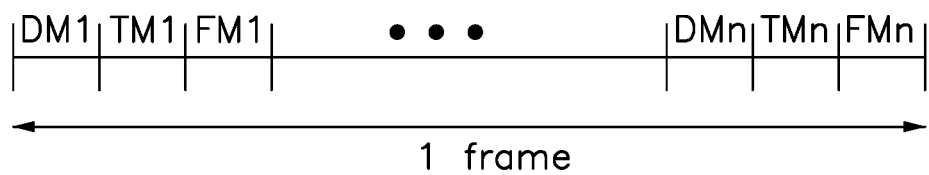
FIG. 6 is a time sequence diagrammatic view of a third exemplary embodiment of the in-cell touch display apparatus of FIG. 1 in one frame.

FIG. 6 illustrates a third embodiment of the time sequence of the in-cell touch display apparatus 500. In one frame, there are a plurality of display periods DM1-DMn, a plurality of touch sensing periods TM1-TMn, and a plurality of the pressure sensing periods FM1-FMn. The in-cell touch display apparatus 500 sequentially operates one of the display periods DM1-DMn, one of the touch sensing periods TM1-TMn, and one of the pressure sensing periods FM1-FMn. A sum of total time of the display periods DM1-DMn in the third exemplary embodiment is equal to the total time of the display period DM in the first exemplary embodiment. A sum of total time of the touch sensing periods TM1-TMn in the third exemplary embodiment is equal to the total time of the touch period TM in the first exemplary embodiment. A sum time of the pressure sensing periods FM1-FMn in the third exemplary embodiment is equal to the time of the pressure period FM in the first exemplary embodiment. In at least one exemplary embodiment, a number of the display periods DM1-DMn is equal to a number of the touch sensing periods TM1-TMn. In other exemplary embodiments, a number of the display periods DM1-DMn is different from a number of the touch sensing periods TM1-TMn.

Figure 7:
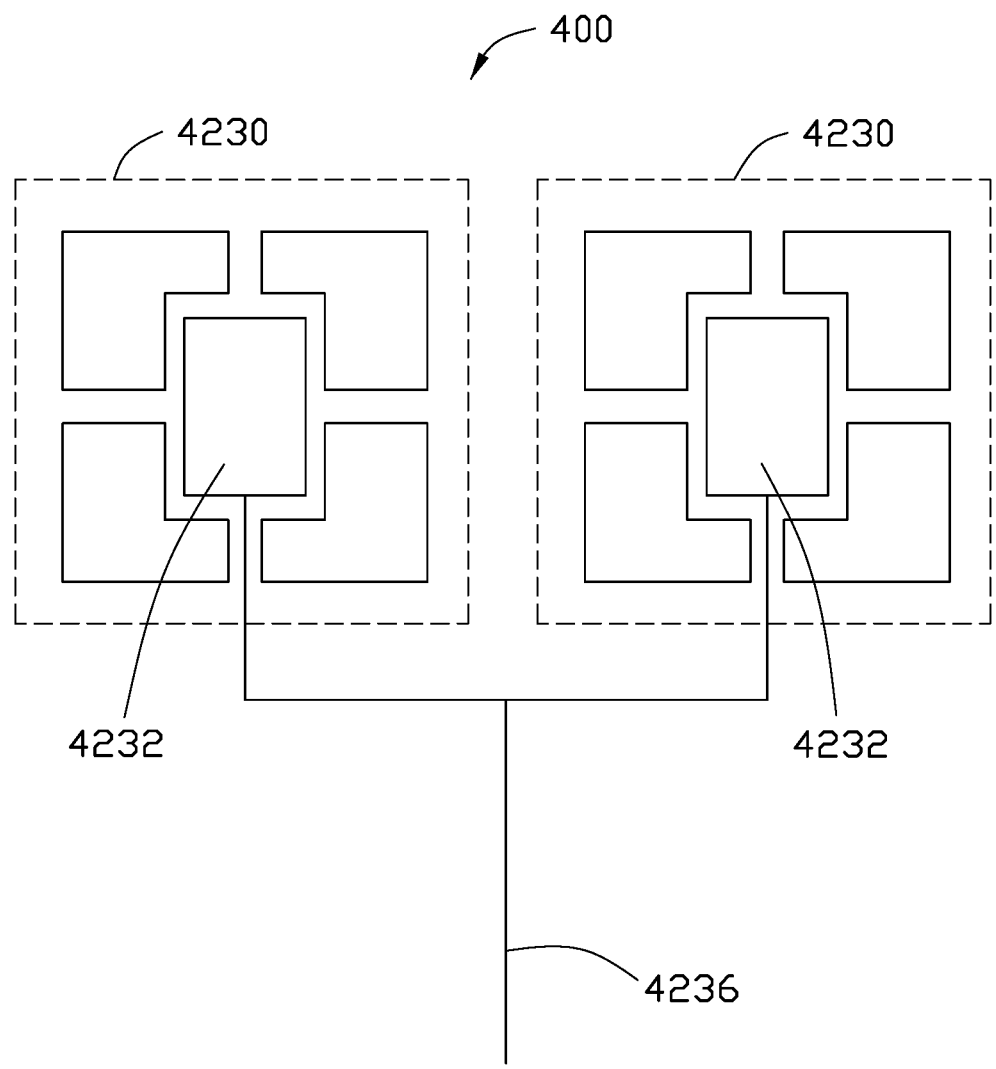
FIG. 7 is a planar view of a second exemplary of the touch electrode layer of FIG. 1.

FIG. 7 illustrates a second embodiment of the in-cell touch display apparatus 400. The structure of the in-cell touch display apparatus 400 is similar to the in-cell touch display apparatus 500. That is, the elements having the same reference numerals in the first embodiment are the same as for this embodiment. The difference between the in-cell touch display apparatus 400 and the in-cell touch display apparatus 500 is in the second conductive lines 4236. In the instant exemplary embodiment, each second conductive line 4236 electrically connects with two pressure sensing electrode 4232 in adjacent touch electrode units 4230. The number of the second conductive lines 4236 is reduced based on the structure of the in-cell touch display apparatus 400.

In the disclosed structure, the touch electrode and the pressure sensing electrode are located in a same layer. The in-cell touch display apparatus is thereby capable of sensing the pressure and the position of the touch action. Therefore, a touch function and a thickness of the in-cell touch display apparatus are improved.

While various exemplary and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. An in-cell touch display apparatus with a plurality of pixel units, the in-cell touch display apparatus comprising:
   a color filter structure;
   a thin film transistor (TFT) array structure;
   a liquid crystal layer between the color filter structure and the TFT array structure; and
   a driving and detection unit;
   wherein the color filter structure comprises a first substrate and a touch electrode layer, the touch electrode layer is disposed on a the first substrate adjacent to the liquid crystal layer; the TFT array structure comprises a second substrate and a conductive layer, the conductive layer is disposed on the second substrate adjacent to the liquid crystal layer; the driving and detection unit are electrically connected to the touch electrode layer and the conductive layer; the touch electrode layer comprises a plurality of touch electrodes arranged in a matrix and a plurality of pressure sensing electrodes arranged in a matrix; the touch electrodes and the pressure sensing electrodes are on a same layer; the conductive layer comprises a plurality of conductive portions; the touch electrodes sense a position of a touch operation applied on the in-cell touch display apparatus; the pressure sensing electrodes and the conductive regions cooperate with each other to sense a pressure of the touch operation applied on the in-cell touch display apparatus;
   wherein the touch electrode layer further comprises touch electrode units arranged in a matrix; each touch electrode unit is defined by four touch electrodes and one pressure sensing electrode; the four touch sensing electrodes in one touch electrode unit are arranged in a 2×2 matrix, and surround the pressure sensing electrode in same touch electrode unit at the center of the touch electrode unit;
   wherein the in-cell touch display apparatus further comprises a storage; the storage stores a first lookup table; each of the touch electrode and the pressure sensing electrode corresponds to at least two of the pixel units; each touch electrode forms a self-capacitance capacitor, and each pressure sensing electrode forms a pressure capacitor; the first lookup table records a relationship between initial capacitances and average grayscale values of the pixel units corresponding to each the touch electrodes and the pressure sensing electrodes in the touch electrode unit the driving and detection unit detects the average grayscale values of the pixel units corresponding to each of the touch electrodes and the pressure sensing electrode, and the driving and detection unit detects current capacitances of the self-capacitance capacitors and the pressure sensing capacitors; the driving and detection unit further obtains initial capacitances of the self-capacitance capacitors and the pressure sensing capacitors based on the detected average grayscale values by searching the first lookup table, calculates capacitance differences between the current capacitances and the initial capacitances, and compares the capacitance difference to obtain a predetermined value.

2. The in-cell touch display apparatus of claim 1, wherein each touch electrode defines an opening at a corner adjacent to the pressure sensing electrode in the same touch electrode unit; gaps between the pressure sensing electrode and the touch electrodes in the same touch electrode unit cooperates with the openings to form a pressure sensing region.

3. The in-cell touch display apparatus of claim 1, wherein each touch electrode is electrically connected to the detection unit by a first conductive line; each pressure sensing electrode is electrically connected to the driving and detection unit by a second conductive line.

4. The in-cell touch display apparatus of claim 1, wherein each touch electrode is electrically connected to the driving and detection unit by a first conductive line; two pressure sensing electrodes in two adjacent touch electrode units are electrically connected to the driving and detection unit by a same second conductive line.

5. The in-cell touch display apparatus of claim 1, wherein when the capacitance difference is larger than or equal to the predetermined value, the driving and detection unit determines that the touch operation is applied on the in-cell touch display apparatus.

6. The in-cell touch display apparatus of claim 1, wherein one frame of driving the in-cell touch display apparatus comprises a display period, a touch sensing period, and a force sensing period.

7. The in-cell touch display apparatus of claim 1, wherein one frame of driving the in-cell touch display apparatus comprises a plurality of display periods, a plurality of touch sensing periods, and a pressure sensing period; the in-cell touch display apparatus alternately operate between one of the display periods and one of the touch sensing periods, and finally operates under the pressure sensing period.

8. The in-cell touch display apparatus of claim 1, wherein in one frame, the one frame includes a plurality of display periods, a plurality of touch sensing periods, and a plurality of pressure sensing periods; the in-cell touch display apparatus sequentially operate one of the display periods, one of the touch sensing periods, and one of the pressure sensing periods.

9. An in-cell touch display apparatus with a plurality of pixel units; the in-cell touch display apparatus comprising:
   a color filter structure;
   a thin film transistor (TFT) array structure;
   a liquid crystal layer between the color filter structure and the TFT array structure;
   a storage configure to record a first lookup table; and
   a driving and detection unit;
   wherein the color filter structure comprises a first substrate and a touch electrode layer, the touch electrode is disposed on the first substrate adjacent to the liquid crystal layer; the touch electrode layer comprises a plurality of touch electrodes arranged in a matrix and a plurality of pressure sensing electrodes arranged in a matrix; each the touch electrode and the pressure sensing electrode corresponds to at least two of the pixel units; each touch electrode forms a self-capacitance capacitor, and each pressure sensing electrode form a pressure capacitor; the first lookup table records a relationship between initial capacitances and average grayscale values of the pixel units corresponding to each of the touch electrodes and the pressure sensing electrodes; the driving and detection unit are electrically connected with the touch electrode layer and the conductive layer; the driving and detection unit detects the average grayscale values of the pixel units corresponding to each the touch electrode and the pressure sensing electrode, and detects current capacitances of the self-capacitance capacitors and the pressures sensing capacitors; the driving and detection unit further obtains initial capacitances of the self-capacitance capacitors and the pressures sensing capacitors based on the detected average grayscale values by searching the first lookup table, calculates a capacitance difference of each current capacitance and the corresponding initial capacitance, and compares the capacitance difference with a predetermined value.

10. The in-cell touch display apparatus of claim 9, wherein when the capacitance difference is larger than or equal to the predetermined value, the driving and detection unit determines that the touch operation is applied on the in-cell touch display apparatus.

11. The in-cell touch display apparatus of claim 9, wherein the TFT array structure comprises a second substrate and a conductive layer, the conductive layer is disposed on the second substrate adjacent to the liquid crystal layer; the conductive layer comprises a plurality of conductive portions; the touch electrodes and the pressure sensing electrodes are located on a same layer; the touch electrodes sense a position of a touch operation applied on the in-cell touch display apparatus; the pressure sensing electrodes and the conductive portions cooperate with each other to sense a pressure of the touch operation applied on the in-cell touch display apparatus.

12. The in-cell touch display apparatus of claim 11, wherein at least two touch electrodes spaced from each other and one of the pressure sensing electrodes form a touch electrode unit; in a same touch electrode unit, the touch electrodes surrounds the pressure sensing electrode.

13. The in-cell touch display apparatus of claim 12, wherein each touch electrode is electrically connected to the driving and detection unit by a first conductive line; each pressure sensing electrode is electrically connected to the driving and detection unit by a second conductive line.

14. The in-cell touch display apparatus of claim 12, wherein each touch electrode is electrically connected to the driving and detection unit by a first conductive line; two pressure sensing electrodes in two adjacent touch electrode units are electrically connected to the driving and detection unit by a same second conductive line.

15. The in-cell touch display apparatus of claim 9, wherein in one frame the in-cell touch display apparatus sequentially operates in a display period, a touch sensing period, and a force sensing period.

16. The in-cell touch display apparatus of claim 9, wherein in one frame, there are a plurality of display periods, a plurality of touch sensing periods, and a pressure sensing period; the in-cell touch display apparatus alternately operated between one of the display periods and one of the touch sensing periods, and finally operates under the pressure sensing period.

17. The in-cell touch display apparatus of claim 9, wherein in one frame, there are a plurality of display periods, a plurality of touch sensing periods, and a plurality of pressure sensing periods; the in-cell touch display apparatus sequentially operates one of the display periods, one of the touch sensing periods, and one of the pressure sensing periods.

* * * * *